Figure 1:
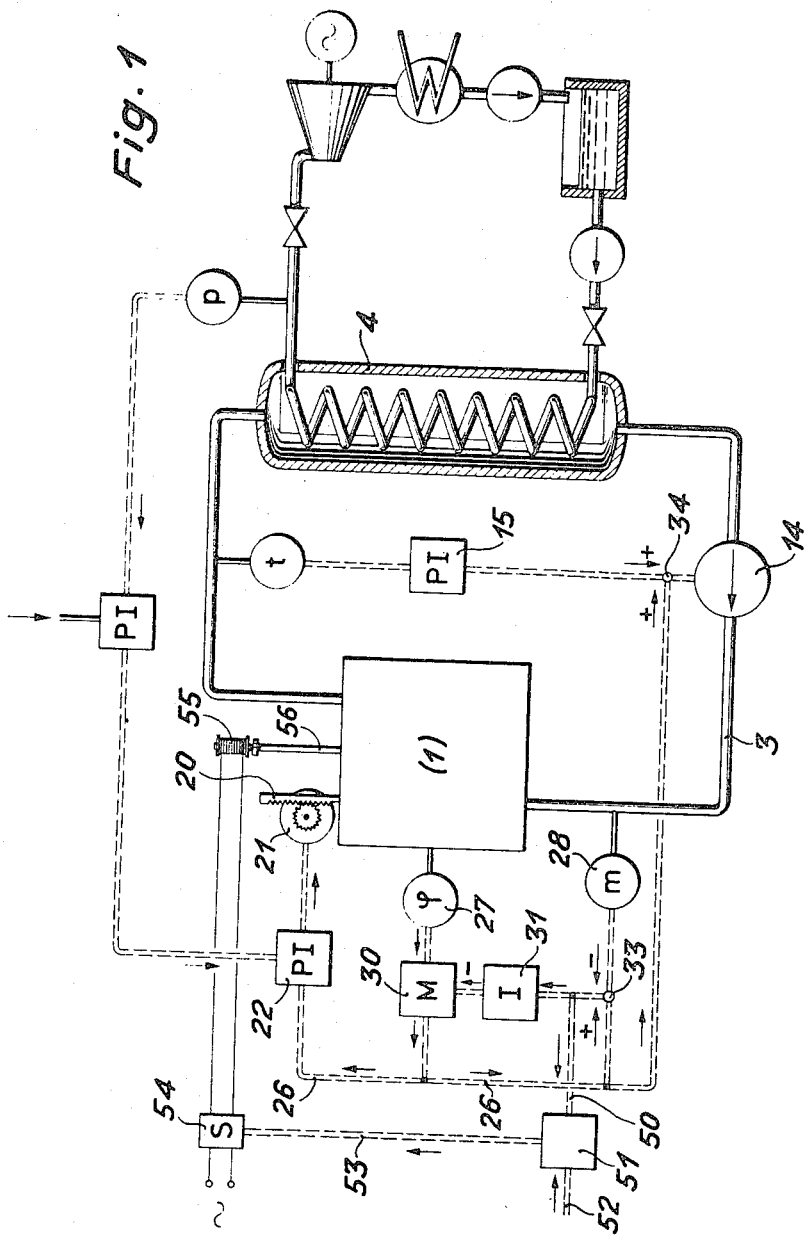

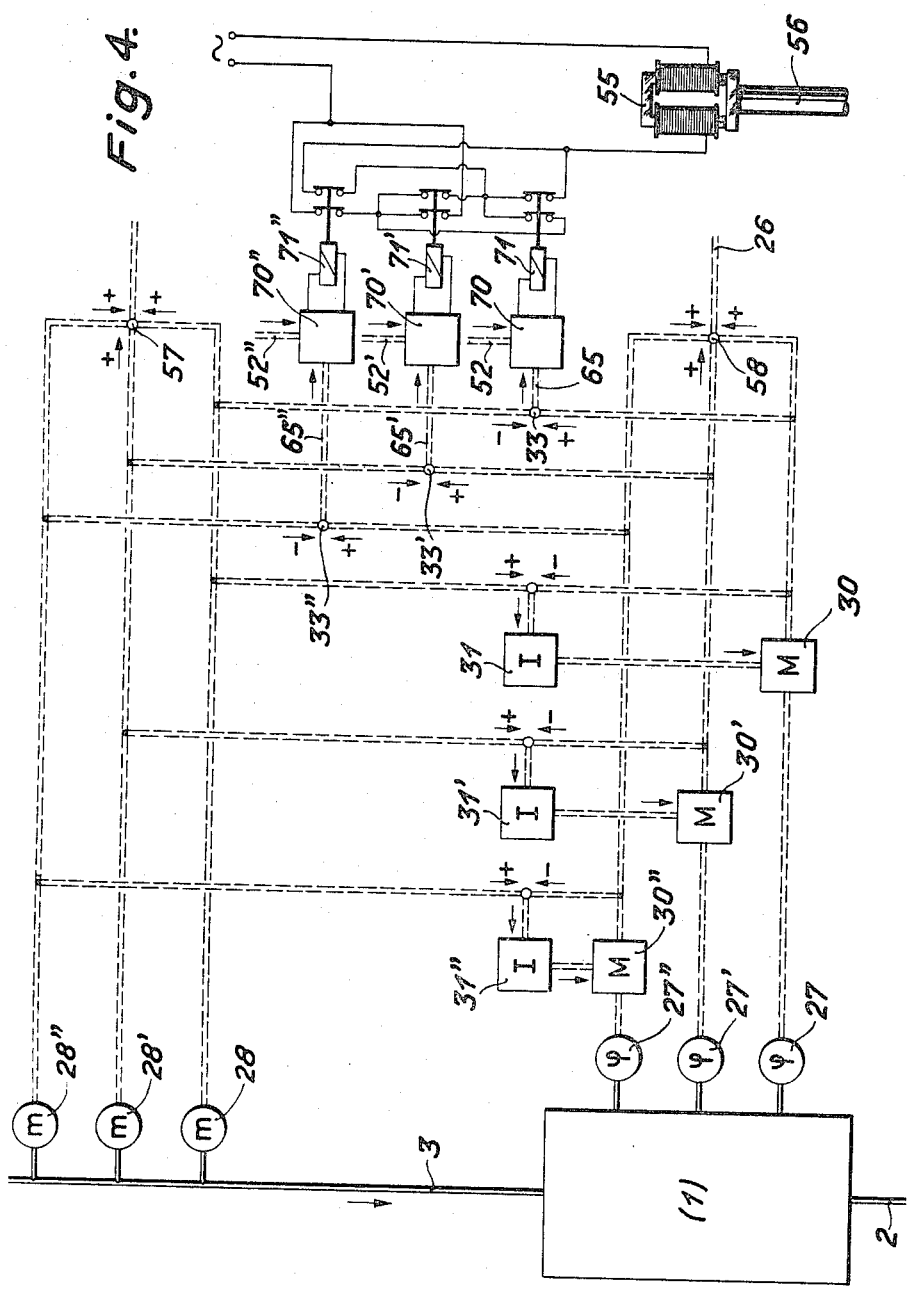

3,341,422
APPARATUS FOR CONTROLLING THE OUTPUT OF A NUCLEAR REACTOR

Jacques Gilbert, Winterthur, Switzerland, assignor to Sulzer Brothers, Limited, Winterthur, Switzerland, a corporation of Switzerland
Filed Nov. 16, 1965, Ser. No. 508,110
Claims priority, application Switzerland, Nov. 16, 1964, 14,792/64
6 Claims. (Cl. 176—20)

This invention relates to a method and apparatus for controlling the output of a nuclear reactor. More particularly, this invention relates to a method and apparatus for controlling the output of a nuclear reactor in response to a signal produced by the difference between a signal dependent on the neutron flux in the reactor and a signal dependent on the heat output of the reactor.

It has been known that the output of a nuclear reactor can be controlled by a method in which the heat generated by a reactor is controlled in dependence upon a signal produced by multiplication of a signal produced by measuring the neutron flux at a point in the reactor by a signal produced in dependence upon the heat output of the reactor. An example of such a method and of an apparatus employing such is disclosed in copending application, Ser. No. 396,901, filed Sept. 16, 1964.

This invention, however, utilizes a method and apparatus in which the heat generated by a reactor is controlled in dependence upon a control signal produced, as above by multiplication in a multiplication element of a signal produced by measuring the neutron flux at a point in the reactor by a signal produced in dependence upon the heat output of the reactor, which is compared with the heat output signal to generate a resultant difference signal which without passing to the multiplication element is also used to control the heat generated by the reactor.

The resultant difference signal is employed for safety purposes to control the reactor during abnormal conditions by comparing the signal to a limiting value signal to produce a second difference signal which when the first resultant difference signal exceeds the limiting value signal can be used to effect rapid shut-down of the reactor, for example, by causing the rapid insertion of normally withdrawn safety control rods into the reactor core. Alternatively, the second difference signal may merely produce a reduction in the heat generated by the reactor. This can be achieved in a reactor in which the heat output of the reactor is extracted by a coolant which generates steam in a heat exchanger by adding the second difference signal to a signal produced in dependence upon the pressure of the generated steam and using the combined signal to control the heat output of the reactor.

According to the present invention, an apparatus for controlling the output of a nuclear reactor includes means for generating a signal in dependence upon the measurement of the neutron flux at a point in the reactor, means for generating a signal in dependence upon the measurement of the heat output of the reactor, means for multiplying the signals generated by the neutron flux measuring means and the heat output measuring means together to produce a resultant control signal, control means for adjusting the control rods of said reactor to control the heat generated by the reactor, means for supplying the resultant control signal to said control means for actuation thereof in dependence upon the resultant control signal, a comparison element arranged to produce a signal in dependence on the difference between the said resultant signal and the signal generated by the heat output measuring means, the output of the comparison element being connected to a second comparison element arranged to produce a signal in dependence upon the difference between the output signal from the first comparison element and a limiting-value signal, and means for controlling the heat generated by the reactor in dependence on the output signal of the second comparison element.

Figure 2:
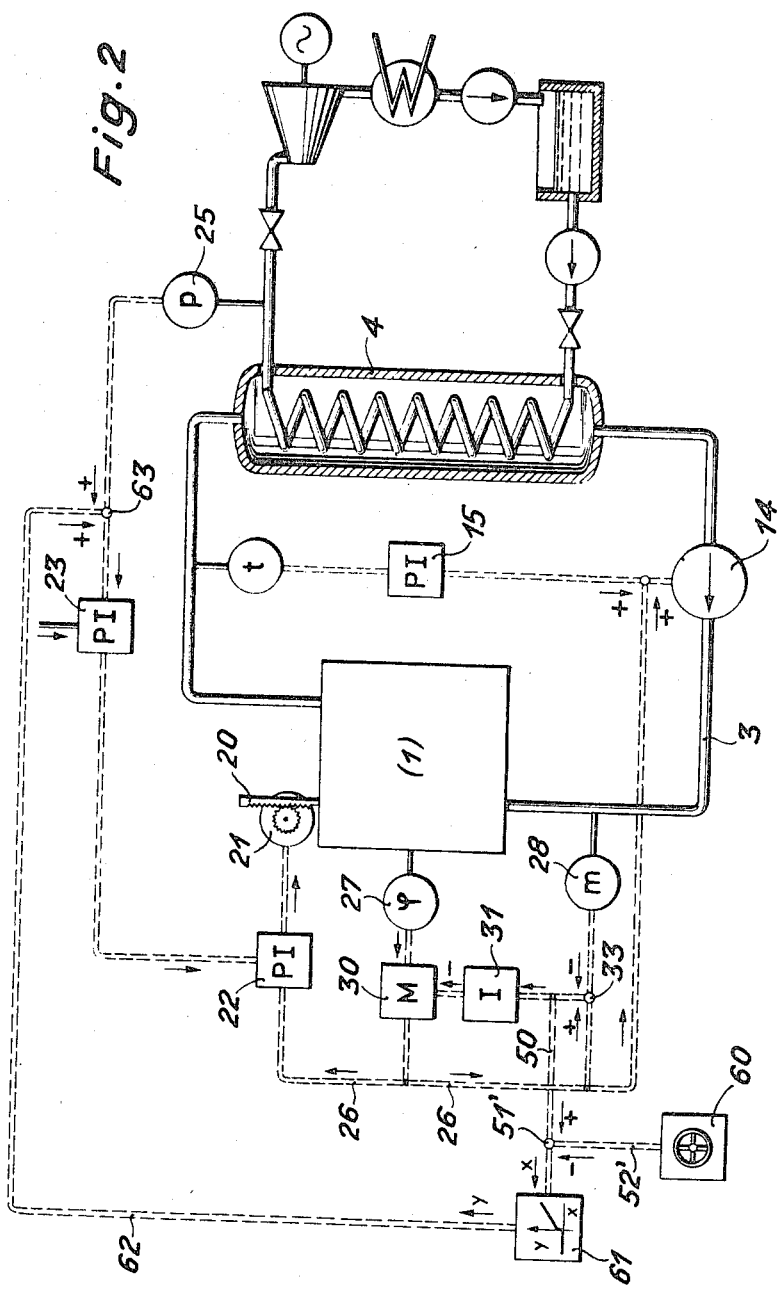
Figure 3:
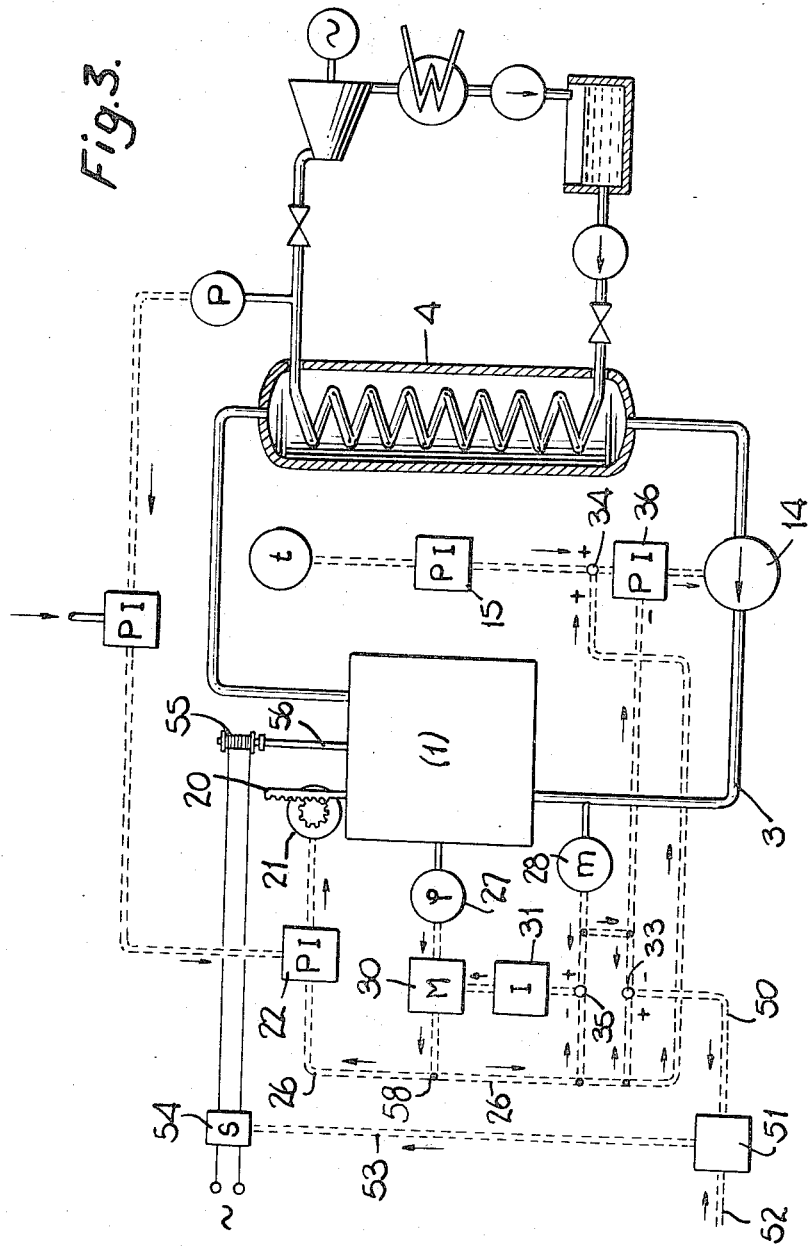

The invention may be carried into practice in various ways but three embodiments will now be described by way of example with reference to the accompanying drawings, in which:

FIGURE 1 shows a nuclear reactor with apparatus for rapid shut-down of the reactor;
FIGURE 2 shows a nuclear reactor with apparatus for reducing the reactor output;
FIGURE 3 shows a modification of the nuclear reactor of FIGURE 1; and
FIGURE 4 shows a nuclear reactor with apparatus for rapid shut-down of the reactor, this apparatus being in the form of a 2-out-of-3 circuit.

In the embodiment shown in FIGURE 1, coolant for a reactor 1 is circulated by means of an infinitely variable circulating element 14, the rate of flow of coolant being determined by a controller 15 with proportional plus integral action in dependence on the temperature at which the coolant leaves the reactor. The coolant heated in the reactor 1 gives up heat in a heat exchanger 4 to the working medium for a steam-raising plant, as described in detail in the patent application referred to above.

The reactor 1 has a device 28 for measuring the rate of flow of coolant in the line 3 and a neutron flux measuring device 27. The measured-value signal from the neutron flux measuring device 27 is conveyed to a multiplication element 30, which also receives from an integrating element 31 a signal derived from the coolant flow measuring device 28. The output signal delivered by the multiplication element is conveyed by a line 26 to a controller 22 with proportional plus integral action, which adjusts the reactor control rods 20 by means of a servomotor 21. The output signal from the multiplication element 30 also acts on a comparing element 33 and an adder 34. The comparing element 33 compares the output signal in the line 26 with the signal from the measuring device 28 and transmits a signal equivalent to the difference between these signals to the integrating element 31.

This difference signal, besides being conveyed to the integrating element 31, is sent along a signal line 50 to a comparing element 51, where it is compared with a limiting-value signal arriving along a signal line 52. The comparing element 51 is connected by a signal line 53 to a switch 54 in the circuit of an electromagnet 55 controlling a neutron-absorbing rod 56, which allows rapid shut-down of the reactor. The sign of the signal from the comparing element 51 depends on whether the difference signal in the line 50 is greater or smaller than the limiting-value signal in the line 52. If the difference signal in the line 50 is greater than the limiting-value signal in the line 52, the output signal in the line 53 opens the switch 54 so that the magnet 55 is without current, the rod 56 falls into the reactor core and the reactor is immediately shut-down.

In the plant shown in FIGURE 2, the neutron flux measuring device 27 and the coolant flow measuring device 28 are connected to the multiplication element 30 in the same way as in FIGURE 1, and the difference signal between the output signal from the multiplication element 30 and the signal from the coolant flow measuring device 28 is again conveyed to a comparing element 51' by way of the signal line 50. This comparing element 51' receives a limiting-value signal from a limiting-value signal source 60 along a line 52' and generates a difference signal $x$ which it sends to a function generator 61.

This generator 61 emits a signal $y$ whose value depends on $x$ according to the function shown and which is conveyed along a signal line 62 to an addition point 63, where it is superimposed on a signal from a pressure-measuring device 25, the latter signal being dependent on the steam pressure at the outlet from the heat exchanger 4. The superimposed signal is then sent to a controller 23 which is supplied with a limiting value signal 24 for comparison with the limiting value signal. If the superimposed signal in the controller 23 is greater than the limiting value signal 24, a control signal is sent to the controller 22 to adjust the control rods 20.

If the neutron flux $\varphi$ suddenly rises steeply, the signal in the line 50 becomes strongly positive. In the comparing element 51' the limiting value signal from the line 52' is subtracted from the signal in the line 50, giving a positive signal $x$. The generator 61 then produces a positive output signal $y$ substantially without delay as shown since the input signal $x$ is positive. The signal $y$ then exceeds zero and an excessive steam pressure is simulated by way of the addition point 63. By way of the proportional actions of the controllers 23 and 22 the reactor output is immediately reduced, the servomotor 21 adjusting the control rods 20 so that they extend further into the reactor core. By this means, the reactor plant is made safe.

In a modification of the plant shown in FIGURE 2, the signal line 62 may contain an element for holding the signal $y$ at the highest value that it ever reaches. Manual intervention is then necessary before this holding of the signal $y$ can be reversed or set at a lower value.

In the plant shown in FIGURE 3, the difference signal formed from the output signal from the device 28 and the output signal from the multiplication element 30 is developed for reasons of safety by two separated comparing elements 33, 35, one of which transmits the difference signal to the integrating element 31 and the other of which transmits an equal difference signal along signal line 50 to the comparing element 51.

In addition, the output signal from the flow measuring device 28 is transmitted to a controller 36 along with a rated value signal from the adder 34 which is formed from the exit signal of the multiplication element 30 and the signal of the coolant temperature between the reactor exit and heat transfer entry. The controller 36 transmits a signal to the variable circulating element 14 to control the amount of coolant as a function of the output signal of the measuring device 28. By utilizing the output signal of the measuring device 28, a fast controlling circuit is established.

FIGURE 4 shows part of a plant which in the parts not shown, is similar to the plant shown in FIGURE 1. In the plant shown in FIGURE 3, the neutron flux measuring device and the coolant flow measuring device are in triplicate. Each of the three neutron flux measuring devices 27, 27', 27'' is connected to a multiplication element 30, 30', or 30'' linked by an integrating element 31, 31' or 31'' to a coolant flow measuring device 28, 28' or 28''. The signal lines from the three coolant flow measuring devices 28, 28', 28'' are combined at a point 57, from which a corresponding measured value signal is passed on, e.g. in the form of a control signal to act on the circulating element 14 through the controller 36. A signal representing the difference between the output signal from the multiplication element 30 and the output signal from the coolant flow measuring device 28 is generated in the comparing element 33. Corresponding comparing elements 33', 33'' are provided for the signals from the multiplication elements 30',30'' and the coolant flow measuring devices 28', 28''. Signal lines 65, 65', 65'' lead from the comparing elements 33, 33', 33'' to devices 70, 70', 70'', each of which corresponds to the comparing element 51 in FIGURE 1. Moreover, the output signal lines from the multiplication elements 30, 30', 30'' are combined at a point 58 to form the signal line 26 leading to the controller 22 and adder 34.

A limiting-value signal is sent to each device 70, 70', 70'' along a line 52, 52', 52''. Between the electromagnet 55, which acts on the rapid shut-down rod 56, and the devices 70, 70', 70'' there are three relays 71, 71', 71'' whose contacts are connected to the coil of the magnet 55 in a known 2-out-of-3 circuit. If the rod 56 is to be released from the electromagnet 55 so that the reactor is shut down quickly, two of the three relays 71, 71', 71'' in this arrangement, which are shown energized in the drawings, must drop out.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. An apparatus for controlling the output of a nuclear reactor having a controller for adjusting the control rods of the reactor to control the heat generated thereby, said apparatus comprising
    first means for generating a first signal in dependence upon the measurement of the neutron flux at a point in said reactor,
    second means for generating a second signal in dependence upon the measurement of the heat output of said reactor,
    a multiplying means operatively connected to said first means for producing a control signal corresponding to the instantaneous output of the reactor,
    a comparing device operatively connected to said second means and said multiplying means for comparing said control signal and said second signal to produce a first difference signal,
    means for comparing said first difference signal to a limiting value signal to produce a second difference signal when said first difference signal exceeds said limiting value signal; and means responsive to said second difference signal for causing a rapid decrease in the heat generated by the reactor.

2. An apparatus as set forth in claim 1 wherein said means for generating a second signal is dependent upon the rate of flow of coolant to said reactor.

3. An apparatus as set forth in claim 1 wherein said means responsive to said second difference signal includes
    a neutron-absorbing rod positioned over said reactor, and
    an electromagnet controlling the position of said neutron-absorbing rod whereby upon release of said neutron-absorbing rod from said electromagnet in response to said second difference signal said neutron-absorbing rod falls into the reactor core to shut-down said reactor.

4. An apparatus as set forth in claim 1 wherein said means responsive to said second difference signal includes
    a function generator for emitting a function generated signal in response to said second difference signal,
    means for generating a third signal in dependence upon the measurement of the pressure of the steam generated by the reactor, and
    means for adding said function generated signal to said third signal at an addition point to produce a combined signal to actuate the controller to reduce the heat output of the reactor.

5. An apparatus as set forth in claim 1 wherein said means for generating a first signal, said means for generating a second signal, said multiplying means, said means to generate said first difference signal, and said means to produce said second difference signal are in triplicate.

6. An apparatus as set forth in claim 5 wherein said means responsive to said second difference signal includes
    a neutron-absorbing rod positioned above said reactor,
    an electromagnet controlling the position of said neutron-absorbing rod, and a 2-out-of-3 circuit for releasing said neutron-absorbing rod from said electromagnet whereby said neutron-absorbing rod falls into the reactor core to shutdown said reactor.

References Cited

FOREIGN PATENTS

| | | |
|---|---|---|
| 632,488 | 10/1963 | Belgium. |
| 1,370,932 | 7/1964 | France. |
| 1,003,410 | 9/1965 | Great Britain. |
| 1,005,940 | 9/1965 | Great Britain. |

CARL D. QUARFORTH, *Primary Examiner.*

L. DEWAYNE RUTLEDGE, *Examiner.*

H. E. BEHREND, *Assistant Examiner.*